US006687290B1

(12) United States Patent
Okazaki

(10) Patent No.: US 6,687,290 B1
(45) Date of Patent: Feb. 3, 2004

(54) APPARATUS FOR FREQUENCY DEVIATION ESTIMATION AND METHOD OF ESTIMATING THE SAME

(75) Inventor: Akihiro Okazaki, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/456,245

(22) Filed: Dec. 7, 1999

(30) Foreign Application Priority Data

Jun. 10, 1999 (JP) .......................................... 11-164312

(51) Int. Cl.⁷ ................................................ H04L 7/00
(52) U.S. Cl. ........................ 375/226; 375/343; 375/344
(58) Field of Search ................................ 375/224, 226, 375/340, 344, 346, 362, 368, 326, 342, 343

(56) References Cited

U.S. PATENT DOCUMENTS

| 5,684,836 | A | | 11/1997 | Nagayasu et al. |
| 6,097,770 | A | * | 8/2000 | Bahai et al. ................. 375/343 |
| 6,347,126 | B1 | * | 2/2002 | Nagayasu et al. .......... 375/344 |
| 6,393,068 | B1 | * | 5/2002 | Rupp ......................... 375/326 |

FOREIGN PATENT DOCUMENTS

| JP | A5-68062 | 3/1993 |
| WO | 98-39854 | 9/1998 |

OTHER PUBLICATIONS

"A Multiple Open–Loop AFC for MPSKI", Kubo et al., Technical Report of IEICE, vol. SAT95–92 (an English Translation).

* cited by examiner

*Primary Examiner*—Amanda T. Le
(74) *Attorney, Agent, or Firm*—Birch, Stewart, Kolasch & Birch, LLP

(57) ABSTRACT

The apparatus for frequency deviation estimation comprises two CIR estimating units (0) that receive a signal containing a known sequence therein and a plurality of correlation units that calculate the cross correlation between a known sequence recognized on a receiving side and the known sequence contained in the received signal. Each of the CIR estimating units (0) estimate the CIR according to correlation values obtained at prescribed timings from the correlation units. A frequency deviation calculating unit calculates frequency deviation according to the CIR. Therefore, the CIR can be determined with a lesser amount of calculation, so that the hardware can be simplified and the power consumption can be reduced.

9 Claims, 9 Drawing Sheets

APPARATUS FOR FREQUENCY DEVIATION ESTIMATION AND METHOD OF ESTIMATING THE SAME

FIELD OF THE INVENTION

The present invention relates to an apparatus for frequency deviation estimation and used in a receiver in the field of radio communication such as mobile communication, satellite communication. More particularly, this invention relates to an apparatus for frequency deviation estimation and estimates frequency deviation that occurs due to the instability in frequency of a local oscillator as well as to a method of estimating such frequency deviation.

BACKGROUND OF THE INVENTION

A conventional frequency deviation estimation apparatus will now be explained. For example, among receivers that are used in mobile communication, there is one in which there is used a coherent detection system, wherein excellent detection characteristics are obtained even from a channel having a low carrier to noise ratio (C/N). In this coherent detection system, the carrier whose frequency is synchronized with the frequency of the carrier of the received signal are carrier estimated, whereby a detection output is obtained according to these estimated carriers. However, in the receiver adopting such a coherent detection system, oscillation frequency fluctuates due to the precision of the oscillator or the fluctuation in the temperature, etc. As a result, a deviation in the frequency is generated between transmitted signal and the received one. The phase of the signal point in the IQ plane (the complex plane defined by a real axis and an imaginary axis) gets rotated when such a frequency deviation exists.

In order to reduce such frequency deviation and thereby realize the enhancement of the synchronization characteristic, a frequency deviation estimation apparatus which can measure the rotation of phase from the received signal and estimate the frequency deviation from this measurement result is required to be used in the receiver. The received signal that has been modulated by the transmitter also contains the rotation of phase resulting from the modulation of the information along with the rotation of phase resulting from the existence of the frequency deviation. Thus, it becomes necessary to eliminate the component corresponding to the modulation of the information in order to estimate the frequency deviation.

For example, as a method of estimating the frequency deviation, there is one that uses a known sequence part contained in the received signal. This method is described in Japanese Patent Application Laid-Open Publication No. HEI 5-68062 entitled "Frequency Offset Compensation Method". FIG. 10 illustrates the construction of a conventional frequency deviation estimation apparatus (corresponding to the coherent detection circuit of Japanese Patent Application Laid-Open Publication No. HEI 5-68062). In FIG. 10, the reference numeral 101 denotes a received signal containing therein a known sequence. The reference numeral 102 denotes an average-phase calculating circuit that calculates an average phase of a partial known sequence which is a part of the known sequence. The reference numeral 103 denotes an average-phase differential circuit for obtaining a difference between n-th average phase and (n+1)-th average phase. The reference numeral 104 denotes an averaging circuit for obtaining an average of the differences so as to calculate the amount of deviation in the phase which is proportional to the frequency deviation.

The operation of the above-described conventional frequency deviation estimation apparatus will be explained hereafter. A known sequence that is previously known on the receiver side is periodically present in the received signal 101. Using this partial known sequence containing a part of a known sequence, the average phase in this portion corresponding to the partial known sequence is determined in the average-phase calculating circuit 102. This determination is made using an RLS algorithm, i.e. recursive least squares method. Further, in the average-phase calculating circuit 102, using other different partial known sequence pieces, a plurality of average phases $\theta k$ (k=1, 2, ..., n, n+1) in the different averaging sections are obtained. It becomes possible to eliminate the information modulation in units of a symbol from the transmitted symbol sequence that is the original sequence of which information modulation is made, because it is known as a known sequence beforehand on the receiving side. Therefore, average phases can be easily determined.

In the average-phase differential circuit 103 corresponding to each average-phase calculating circuit 102 a difference between the k-th average phase $\theta k$ and the (k+1)-th average phase $\theta k+1$ is calculated to obtain the received phase difference portions $\Delta\theta k$ (k=1, 2, ..., n, n+1). Finally, the averaging circuit 104 averages the plurality of phase difference portions $\Delta\theta k$ to obtain the amount of deviation in the phase which is proportional to the frequency deviation.

However, in the above-described conventional frequency deviation estimation apparatus, intersymbol interference (the interference between adjacent symbols) sometimes occurs according to the circumstances of the channel. When applying FIG. 10 to the received signal that has been received via the channel in which intersymbol interference exists, there is the problem that it becomes impossible to correctly eliminate the modulation of the information in the average-phase calculating circuit 102. Since correct average phases cannot be obtained, the frequency deviation estimation characteristic of the frequency deviation estimation apparatus get deteriorated.

Further, in the RLS algorithm executed in the average-phase calculating circuit 102 of the conventional frequency deviation estimation apparatus tap gain is so controlled as to minimize the accumulation of the squared values of the frequency deviation that are made until tap gains are respectively updated. As a result, an optimum tap gain is reached with a high speed. However, the recursive least squares method adopted herein requires a large amount of calculation, raising the problem that the apparatus was very inefficient from the viewpoint of the construction of the hardware and the consumption of the power.

SUMMARY OF THE INVENTION

The present invention has been made in view of the above and has an object to provide an apparatus for frequency deviation estimation, which can realize the enhancement of the frequency deviation estimation characteristic of the received signal, the received signal being one wherein intersymbol interference has occurred, which can realize the simplification of the hardware and the reduction in the power consumption by determining the CIR (Channel Impulse Response) with a lesser amount of calculation, and which can realize optimum estimation of the frequency deviation by adjusting the detection precision and detection range regarding the frequency deviation, and a method of realizing the same.

According to a first aspect of the frequency deviation estimation apparatus that receives a signal containing therein a known sequence having an elementary pattern repeated therein, a channel impulse response estimating unit estimates channel impulse responses at a plurality of timings according to the elementary pattern in the known sequence contained in the received signal, and a frequency deviation calculating unit calculates frequency deviation according to the estimated channel impulse responses. Therefore, the modulation of the information can highly precisely be eliminated from the signal received via the channel in which intersymbol interference exists, and correct channel impulse response (that can be determined using a known method such as an RLS algorithm) can be obtained accordingly.

According to this invention, a channel impulse response estimating unit having a correlation unit that determines the channel impulse response (CIR) with a lesser amount of calculation is provided so that it is possible to achieve the simplification of the hardware and simultaneously realize the large reduction in the power consumption. Further, a frequency deviation calculating unit is provided so that a trade-off between the frequency deviation detection precision and the frequency deviation detection range becomes possible. Therefore, it is possible to optimally estimate the frequency deviation accordingly.

According to a second aspect of the frequency deviation estimation apparatus that receives a signal containing therein a known sequence having an elementary pattern repeated therein, a first channel impulse response estimating unit estimates a first channel impulse response according to the elementary pattern in the known sequence contained in the received signal, a second channel impulse response estimating unit estimates a second channel impulse response according to a sequence prepared by performing cyclic-shifting of the known sequence, and a frequency deviation calculating unit calculates frequency deviation according to the first and second channel impulse responses. Therefore, the modulation of the information can highly precisely be eliminated from the signal received via the channel in which intersymbol interference exists, and more correct channel impulse response (that can be determined using a known method such as an RLS algorithm) can be obtained accordingly.

According to this invention, a first channel impulse response estimating unit having a first correlation unit that determines the channel impulse response (CIR) with a lesser amount of calculation and a second channel impulse response estimating unit having a second correlation unit are provided so that it is possible to achieve the simplification of the hardware and simultaneously realize the large reduction in the power consumption. Further, a desired detection precision and detection range of frequency deviation can be set more in detail, with the result that it is possible to optimally estimate the frequency deviation accordingly.

According to this invention, a complex-adder performs complex addition of the complex conjugate products that have been calculated in the phase difference vector calculating unit. This equivalently means maximum ratio combining the rotating amounts of phase that have been procured from the channel impulse response. Therefore, the averaging effect for suppressing the noises is obtained. Also, in the deviation calculating unit, the frequency deviation detection precision is proportional to the timing-to-timing interval at which the CIR is procured and, further, the frequency deviation detection range is inversely proportional to the timing-to-timing interval at which the CIR is procured. Namely, these timing-to-timing intervals function as the trade-off parameters between the frequency deviation detection precision and the frequency deviation detection range. As a result of this, it becomes possible to adjust the frequency deviation detection precision and the frequency deviation detection range in correspondence with the status of use, which makes it possible to realize optimum estimation of the frequency deviation.

According to this invention, in one frequency deviation estimating unit, since the detection precision and the detection range are in the relationship of trade-off, either one of them is preferentially selectively determined. On this account, the invention is arranged to be equipped with a plurality of frequency deviation estimating unit having set therein respectively different estimation precision degrees and estimation ranges. In addition, the frequency deviation that are output from the respective frequency deviation estimating unit are combined by the frequency deviation combining unit. As a result of this, it is possible to realize a higher-precision and wider-range-of-frequency-band frequency deviation estimation apparatus.

According to this invention, a channel impulse response estimating unit having a correlation unit that determines the channel impulse response (CIR) with a lesser amount of calculation is provided so that it is possible to achieve the simplification of the hardware and simultaneously realize the large reduction in the power consumption. Further, a frequency deviation calculating unit is provided so that it becomes possible to perform the trade-off between the frequency deviation detection precision and the frequency deviation detection range and to optimally estimate the frequency deviation accordingly.

According to this invention, the modulation of the information can be highly precisely eliminated from the signal received via the channel in which intersymbol interference exists, and correct channel impulse response (that can be determined using a known method such as an RLS algorithm) can be obtained accordingly. Therefore, it is possible to greatly enhance the frequency deviation estimation characteristic.

According to this invention, a channel impulse response estimating step is provided that determines the channel impulse response (CIR) with a lesser amount of calculation so that it is possible to achieve the simplification of the hardware and simultaneously realize the large reduction in the power consumption. Further, a frequency deviation calculation step is provided so that it becomes possible to perform the trade-off between the frequency deviation detection precision and the frequency deviation detection range and to optimally estimate the frequency deviation accordingly.

According to this invention, the modulation of the information can be highly precisely eliminated from the signal received via the channel in which intersymbol interference exists, and more correct channel impulse response (that can be determined using a known method such as an RLS algorithm) can be obtained accordingly. Therefore, it is possible to greatly enhance the frequency deviation estimation characteristic.

According to this invention, a first channel impulse response estimating step and the second channel impulse response estimating step are provided that determines the channel impulse response (CIR) with a lesser amount of calculation so that it is possible to achieve the simplification of the hardware and simultaneously to realize the large reduction in the power consumption. Further, a desired detection precision and detection range of frequency deviation can be set more in detail, with the result that it is possible to optimally estimate the frequency deviation accordingly.

According to this invention, a complex-adding step is provided which performs complex addition of the complex conjugate products that have been calculated in the phase difference vector calculating step. This becomes equivalent to maximum ratio combining the rotating amounts of phase that have been procured from the channel impulse response. As a result, it is possible to obtain the averaged effect for suppressing the noises. Also, in the deviation calculating step, the frequency deviation detection precision is proportionate to the timing-to-timing interval at which the CIR is procured and, further, the frequency deviation detection range is inversely proportional to the timing-to-timing interval at which the CIR is procured. Namely, here, these timing-to-timing intervals function as the trade-off parameters between the frequency deviation detection precision and the frequency deviation detection range. As a result of this, it becomes possible to adjust the frequency deviation detection precision and the frequency deviation detection range in correspondence with the status of use, which makes it possible to realize optimum estimation of the frequency deviation.

According to this invention, in one frequency deviation estimating step, since the detection precision and the detection range are in the relationship of trade-off, either one of them is preferentially selectively determined. On this account, a plurality of frequency deviation estimating steps are provided so as to be able to set therein respectively different estimation precision degrees and estimation ranges. In addition, the frequency deviation that are output in the respective frequency deviation estimating steps are combined in the frequency deviation combining step. As a result of this, it is possible to realize a higher-precision and wider-range-of-frequency-band frequency deviation estimating method.

According to this invention, a channel impulse response estimating step is provided that determines the channel impulse response (CIR) with a lesser amount of calculation so that it is possible to achieve the simplification of the hardware and simultaneously realize the large reduction in the power consumption. Further, a frequency deviation calculating step is provided so that it becomes possible to perform the trade-off between the frequency deviation detection precision and the frequency deviation detection range and to optimally estimate the frequency deviation accordingly.

According to this invention, in a complex-adding step the complex addition of the complex conjugate products that have been calculated in the phase difference vector calculating step is performed. This becomes equivalent to maximum ratio combining the rotating amounts of phase that have been procured from the channel impulse response. As a result, it is possible to obtain the averaging effect for suppressing the noises. Also, in the deviation calculating step, the frequency deviation detection precision is proportionate to the product of the timing-to-timing intervals at which the CIRs are procured and, further, the frequency deviation detection range is inversely proportionate to the timing-to-timing interval at which the CIR is procured. Namely, here, these timing-to-timing intervals function as the trade-off parameters between the frequency deviation detection precision and the frequency deviation detection range. As a result of this, it becomes possible to adjust the frequency deviation detection precision and the frequency deviation detection range in correspondence with the status of use, which makes it possible to realize optimum estimation of the frequency deviation.

Other objects and features of this invention will become apparent from the following description with reference to the accompanying drawings.

DESCRIPTION OF THE PREFERRED EMBODIMENTS

Embodiments of a frequency deviation estimation apparatus according to the present invention will now be explained in detail with reference to the drawings. It is to be noted that the present invention is not limited to such embodiments.

Figure 1:
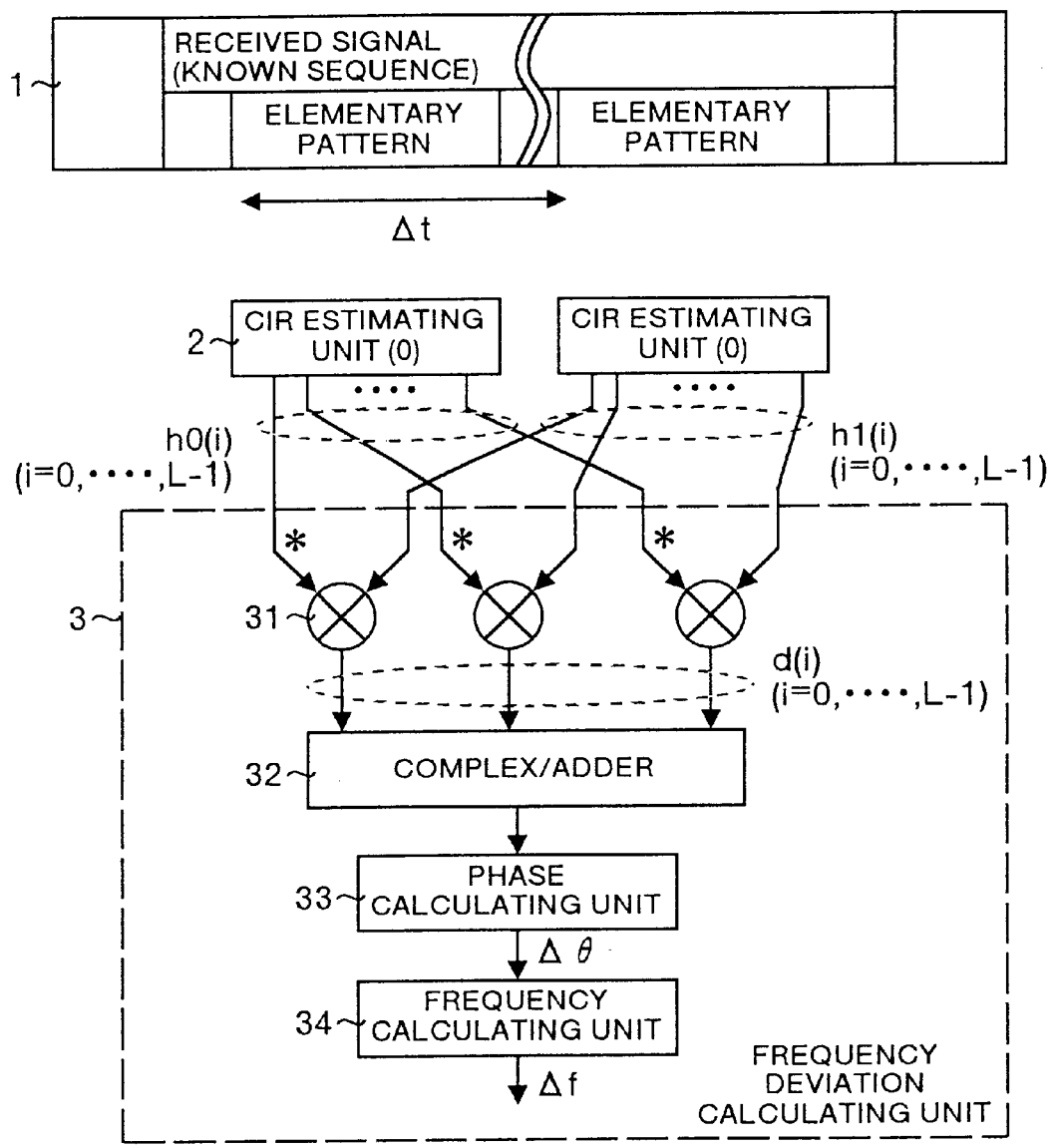
FIG. 1 illustrates the construction of a first embodiment of a frequency deviation estimation apparatus according to the present invention.
Figure 2:
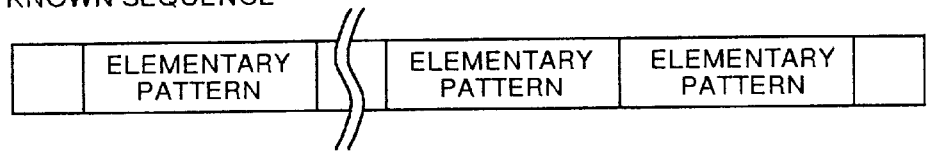
FIG. 2 illustrates a specific example of a received signal containing therein a known sequence.

FIG. 1 illustrates the construction of a first embodiment of a frequency deviation estimation apparatus according to the present invention. In FIG. 1, the reference numeral 1 denotes a received signal that contains a known sequence that has an elementary pattern repeated therein at least once as illustrated in, for example, FIG. 2. Further, the reference numeral 2 denotes a CIR estimating unit (0) that estimates a channel impulse response (hereinafter called "a CIR") indicating a channel impulse response according to the elementary pattern. The reference numeral 3 denotes a frequency deviation calculating unit. The frequency deviation estimation apparatus according to the present invention is constituted by the CIR estimating unit (0) and the frequency deviation calculating unit 3. It is to be noted that the frequency deviation calculating unit 3 is constituted by a complex conjugate multiplier 31, a complex adder 32, a phase calculating unit 33, and a frequency calculating unit 34 each of which are described in detail later.

The operation of the frequency deviation estimation apparatus according to the present invention will now be explained. As previously mentioned, the received signal 1 contains therein a known sequence (the elementary patterns) that is known beforehand on a receiving side. A sequence whose auto-correlation characteristics are sharp and which is independently used as a known sequence may be considered as the elementary pattern. Concretely, for example, a maximum-length sequence (hereinafter called "an M sequence") can be taken up as an example.

First, at a timing that corresponds to an elementary pattern in this received signal, the CIR of the channel is estimated in the CIR estimating unit (0) 2. Namely, one or more channel impulse responses that correspond to the time delays presumed to exist are estimated in the CIR estimating unit (0) 2. It is to be noted that the CIR that is estimated here is the one that is prepared by combining the delay waves coherently, and therefore has the effect of suppressing the intersymbol interference. Accordingly, here, the frequency deviation is estimated using a change in phase of this CIR due to the change in time interval and, therefore, it becomes possible to estimate a correct frequency deviation even in a case where intersymbol interference exists.

Figure 3:
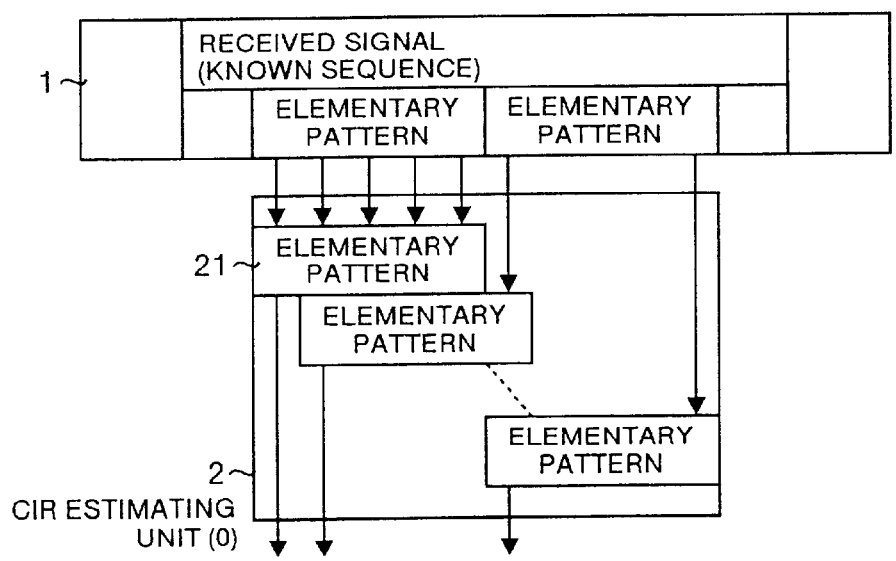
FIG. 3 illustrates the construction of a CIR estimating unit in the case of using a sequence wherein auto-correlation characteristic is sharp.

Here, a specific construction example of the CIR estimating unit (0) 2 in the case where using a sequence whose auto-correlation characteristics are sharp, i.e. where using an M sequence is illustrated in FIG. 3. In FIG. 3, using a plurality of cross correlation units 21 for procuring the cross correlation between the known elementary pattern and the known sequence of the received signal, the CIR estimating unit (0) 2 determines correlation values that correspond to the respective timings after the passage of the time interval from the respective timings of the elementary patterns to the respective timings at which the CIRs are determined as the values approximate to the CIRs. Accordingly, by the use of this CIR estimating unit (0) 2, it is possible to procure CIR values with a lesser amount of calculation than that in the case of using the least squares method as in the prior art.

To explain concretely, for example, in this embodiment, since a plurality of elementary patterns are contained in the known sequence, there exists a plurality of timings at which the CIR estimating unit (0) 2 is operable. Here, the CIR estimating units (0) 2 are operated at two timings such as those illustrated in FIG. 1 wherein cross correlation is established among the plurality of timings, and the CIRs at the respective points in time are determined. It is to be noted that, in this embodiment, CIRs are procured, for example, a plurality of times from 0 to (L−1) and the values of the CIRs procured from the respective CIR estimating units (0) 2 are assumed to be h0 (i) and h1 (i) (where i=0, ..., L−1), respectively. Also, the difference between the two points in time at which to start the operations of the CIR estimating unit (0) 2 is assumed to be Δt.

Next, the frequency deviation calculating unit 3 receives the CIRs that have been obtained from the two CIR estimating units (0) 2. Then, the complex conjugate multiplier 31 calculates a complex conjugate product d (i) (where i=0,...,L−1) as expressed in the following equation (1). It is to be noted that, a rotation in phase resulting from the frequency deviation generated during the timing-to-timing interval Δt is contained in the phase of this complex conjugate product.

$$d(i)=h0(i)^* \times h1(i) \tag{1}$$

where the symbol * represents a complex conjugate.

Next, complex addition of the complex conjugate products that have been calculated in the complex conjugate multiplying units 31 is performed in the complex adder 32. The complex addition that is performed here is equivalent to the maximum ratio combining of the rotation in phase that have been procured from the CIRs, whereby the averaging effect of suppressing the noises is obtained. And, the phase calculating unit 33 receives the thus-obtained complex addition result and extracts the rotating amount of phase Δθ. It is to be noted that this rotation in phase represents the amount of phase that has been rotated due to the frequency deviation made during the interval Δt.

Finally, a frequency deviation ΔF is calculated in the frequency calculating unit 34 from the rotation in phase Δθ that has been extracted in the phase calculating unit 33. Here, since the rotation in phase Δθ is the angle of rotation through which the phase has been rotated due to the frequency deviation ΔF that has been made during the interval Δt, the frequency deviation ΔF can be determined according to the equation (2) below.

$$\Delta F = \Delta\theta/\Delta t \tag{2}$$

Provided, however, that the frequency deviation detection precision at this time is proportional to the product of the length of the elementary pattern sequence and the timing-to-timing interval Δt during which the CIRs have been procured. Further, the frequency deviation detection range is inversely proportional to the timing-to-timing interval Δt during which the CIRs have been procured. Namely, the timing-to-timing interval Δt becomes the trade-off parameter between the frequency deviation detection precision and the frequency deviation detection range.

In this way, in this embodiment, a correct frequency deviation is obtained even under the circumstances of intersymbol interference. Further, by equipping the apparatus with the CIR estimating unit (0) 2 that determines CIRs with a lesser amount of calculation, it is possible to achieve the simplification of the hardware and simultaneously realize a large reduction in the power consumption. Further, by equipping the apparatus with the frequency deviation calculating unit 3 that enables the trade-off between the frequency deviation detection precision and the frequency deviation detection range, it is possible to adjust the detection precision and the detection range regarding the frequency deviation. Accordingly it is possible to optimally estimate a frequency deviation.

In this embodiment the invention has been explained using two elementary patterns in one known sequence, however the invention is not limited thereto. For instance, in a transmission system wherein a frame containing a known sequence therein is successively sent out, the same effect can be obtained by using the elementary patterns in the known sequence pieces contained in a plurality of frames. In this case, however, since the interval Δt can be set longer, it is possible to detect a frequency deviation with a higher precision.

Further, in this embodiment, the CIR estimation that uses a correlation unit has been explained. However, the same effect as that stated above can be obtained if CIR is estimated by using a known method such as an RLS algorithm.

Figure 4:
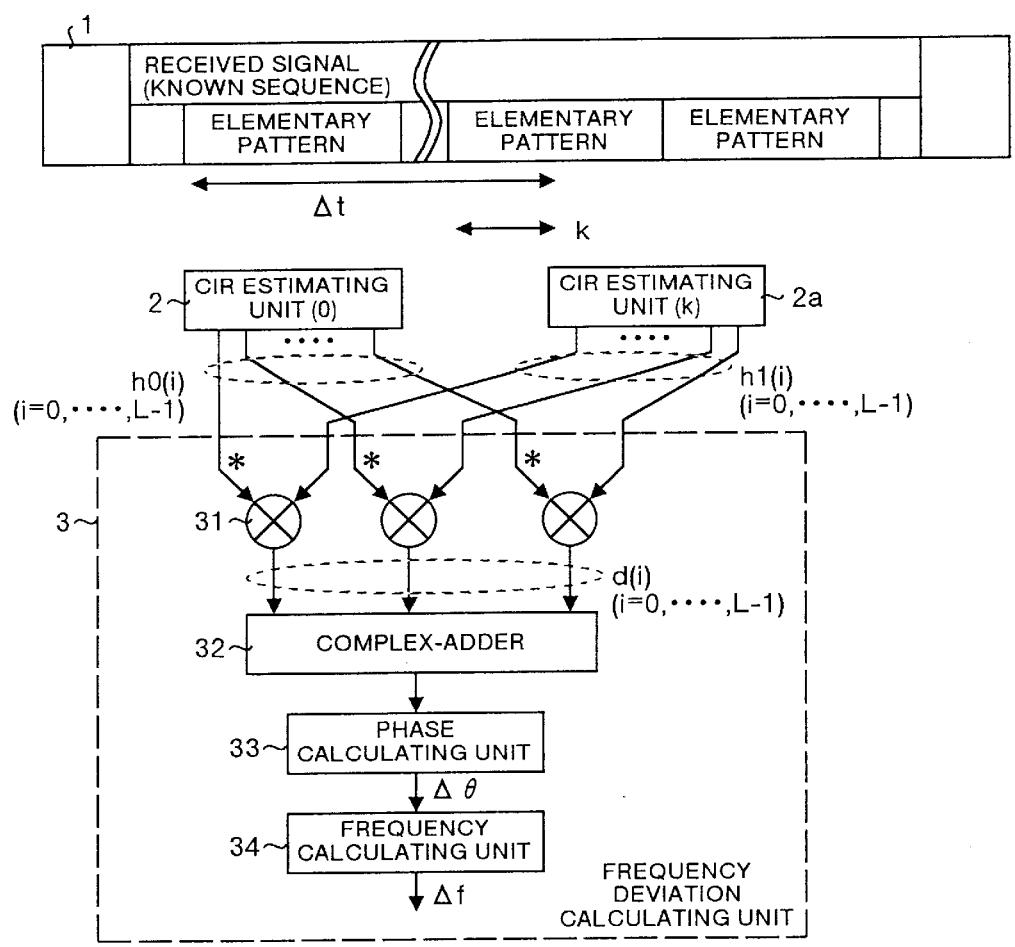
FIG. 4 illustrates the construction of a second embodiment of the frequency deviation estimation apparatus according to the present invention.

FIG. 4 illustrates the construction of a second embodiment of the frequency deviation estimation apparatus according to the present invention. In FIG. 4, the reference numeral 1 denotes a received signal that is the same as that in the first embodiment. Also, the reference numeral 2a denotes a CIR estimating unit (k) that estimates CIR representing the channel impulse response from a sequence prepared by performing leftward k-cyclic-shifting of the elementary pattern. Accordingly, the illustrated CIR estimating unit (0) 2 is equivalent to the CIR estimating unit (k) wherein k=0. It is to be noted that other components are the same as those of the previously explained first embodiment and therefore are denoted by the same reference symbols and their explanation is omitted.

The operation of the frequency deviation estimation apparatus according to the present invention will hereafter be explained. In this embodiment, only the differences between the previously explained first embodiment will be described. Therefore, the operation of the CIR estimating unit (k) 2a will be mainly explained.

In the CIR estimating unit (k) 2a, as the sequence used to estimate CIR, for example, there is used a sequence prepared by performing leftward k-cyclic-shifting of the elementary pattern. As a result of this, in the CIR estimating unit (k) 2a, as illustrated in FIG. 4, CIR is estimated at a position that has been shifted by the extent of k from the position of the elementary pattern. Namely, in the first embodiment, the interval Δt was limited to the value that was an integer multiple of the length of the elementary pattern sequence. In this embodiment, however, the interval Δt can be varied by arbitrarily determining the value of k.

Figure 5:
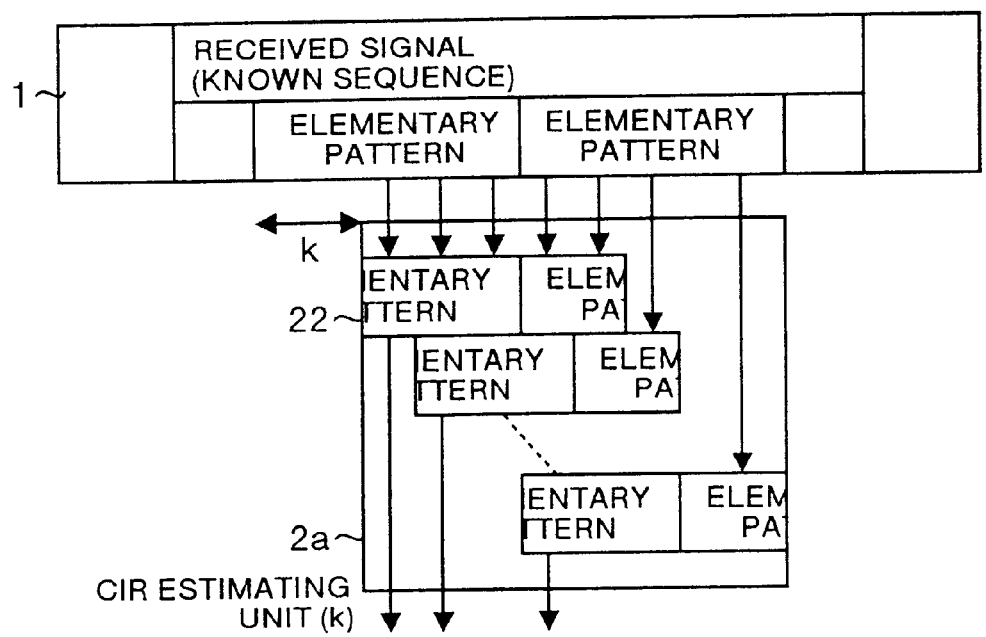
FIG. 5 illustrates the construction of the CIR estimating unit in the case of using a sequence wherein auto-correlation characteristic is sharp.

Here, a specific example of construction of the CIR estimating unit (k) 2a in the case of using the M sequence is illustrated in FIG. 5. In FIG. 5, using a plurality of cross correlation units 22 for procuring the cross correlation between the sequence prepared by performing k-cyclic-shifting of the elementary pattern and the known sequence of the received signal, the CIR estimating unit (k) 2a determines correlation values that correspond to the respective timings after the passage of the time interval from the respective timings of the elementary patterns to the respective timings at which the CIRs are determined as the values approximate to the CIRs. Accordingly, by the use of this CIR estimating unit (k) 2a, it is possible to procure CIR values with a lesser amount of calculation than that in the case of using the least squares method as in the prior art.

Figure 6:
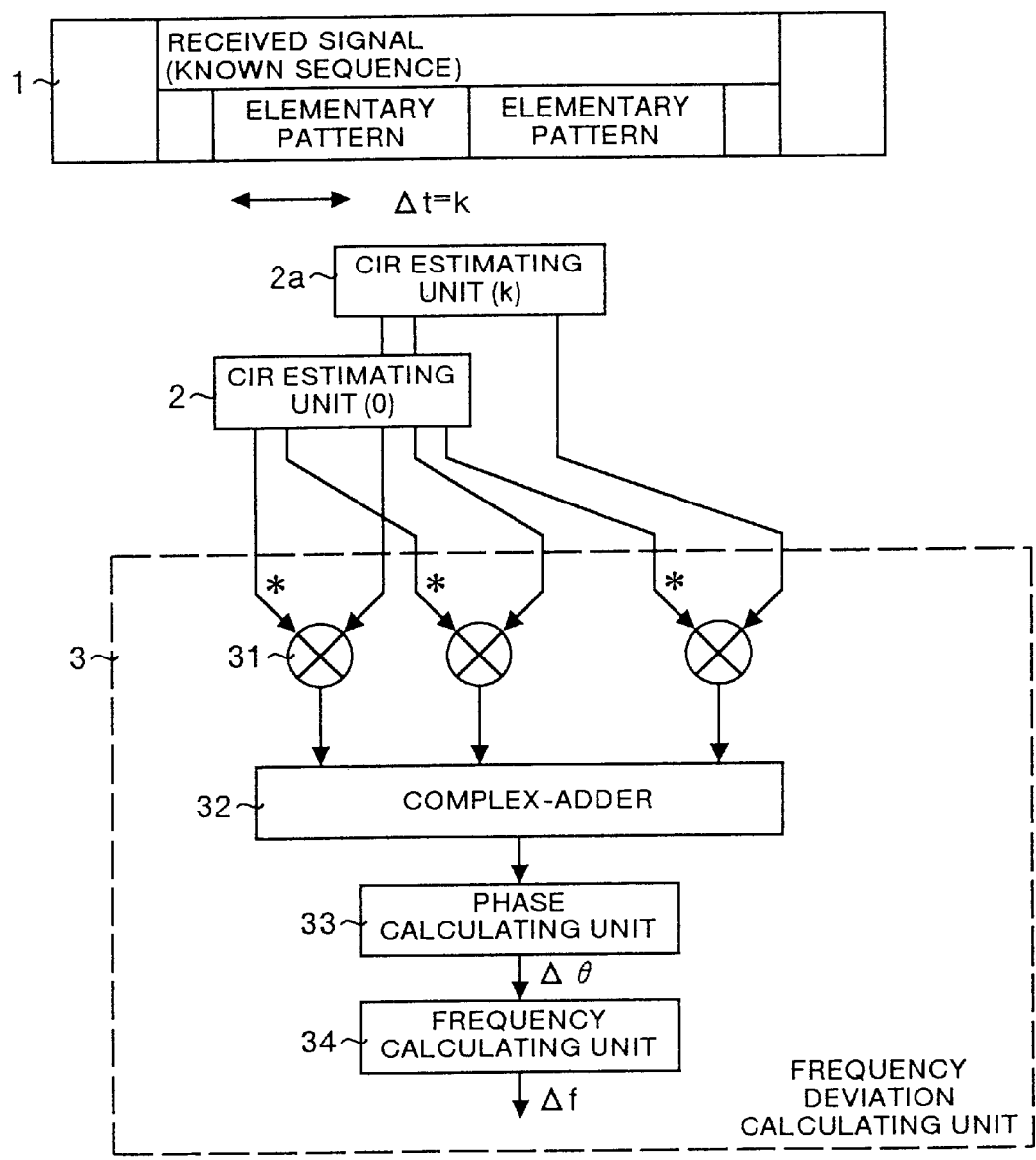
FIG. 6 illustrates a specific example of setting a timing-to-timing interval $\Delta t$.
Figure 7:
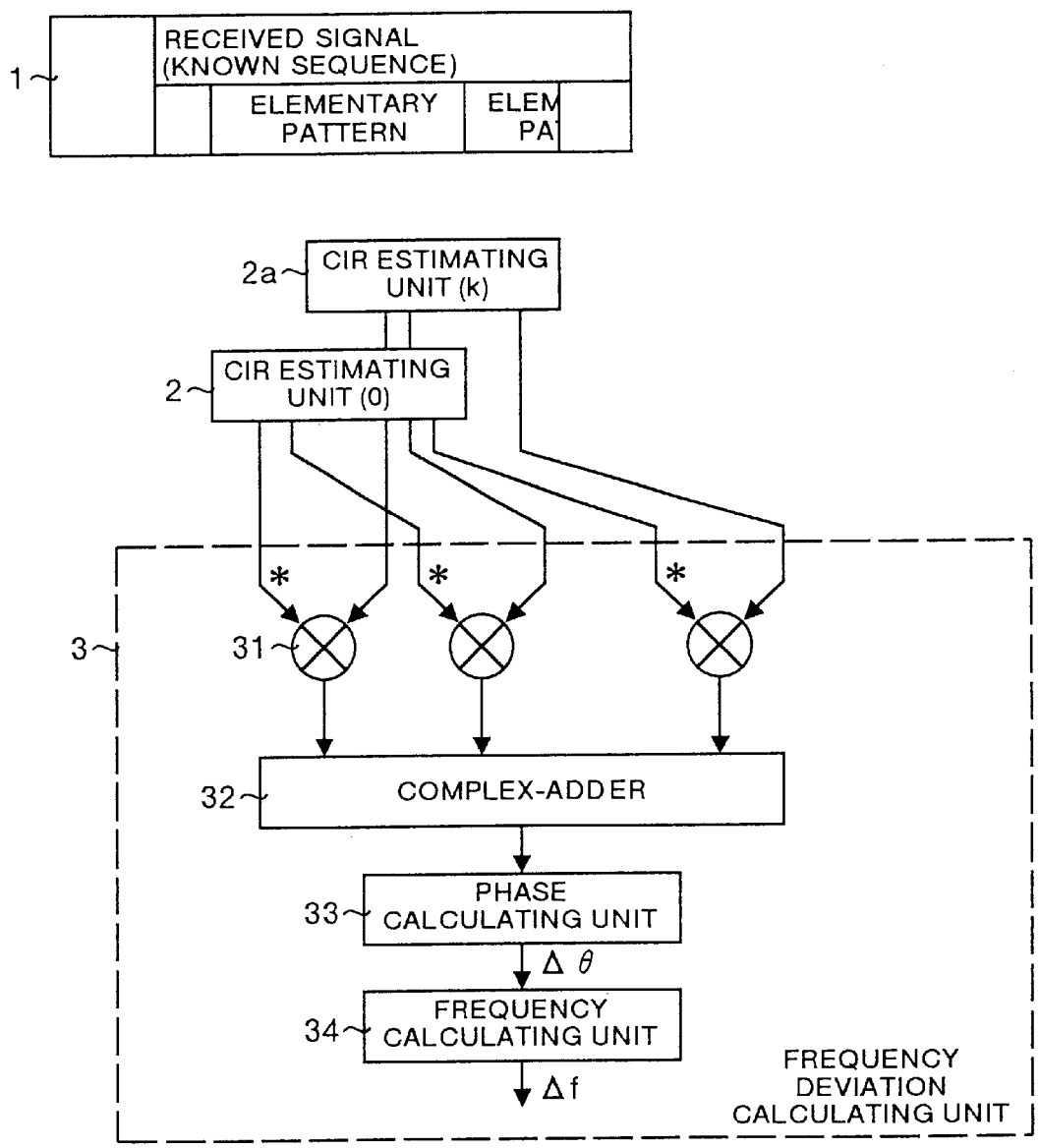
FIG. 7 illustrates a specific example of setting a timing-to-timing interval $\Delta t$ that is different from that of FIG. 6.

In this way, in this embodiment, the same effect as that in the first embodiment can be obtained. In addition, the timing-to-timing interval Δt can be arbitrarily set in the course of the section "the known sequence length—the elementary pattern length" or a section shorter than this section. Therefore, a desired estimation precision and detection range of estimating and detecting a frequency deviation can be set more in detail. For example, FIG. 6 and FIG. 7 show a specific example of setting the timing-to-timing interval Δt. It is to be noted that the construction of FIG. 6 is the one that permits the duplicate use of the received signal in the two CIR estimating units (the CIR estimating unit (0) 2 and the CIR estimating unit (k) 2a) each using the received signal as an input signal. FIG. 7 illustrates the construction which, in the construction of FIG. 6, estimates CIR by using a elementary pattern whose known sequence is complete and a part of this elementary pattern having a length of k. In this example, the length of the known sequence is set to minimum. As illustrated, for example, when Δt=k, the timing-to-timing interval Δt becomes shorter than that corresponding to the elementary pattern sequence length. As a result, a wider frequency-band range of detecting a frequency deviation can be realized.

Figure 8:
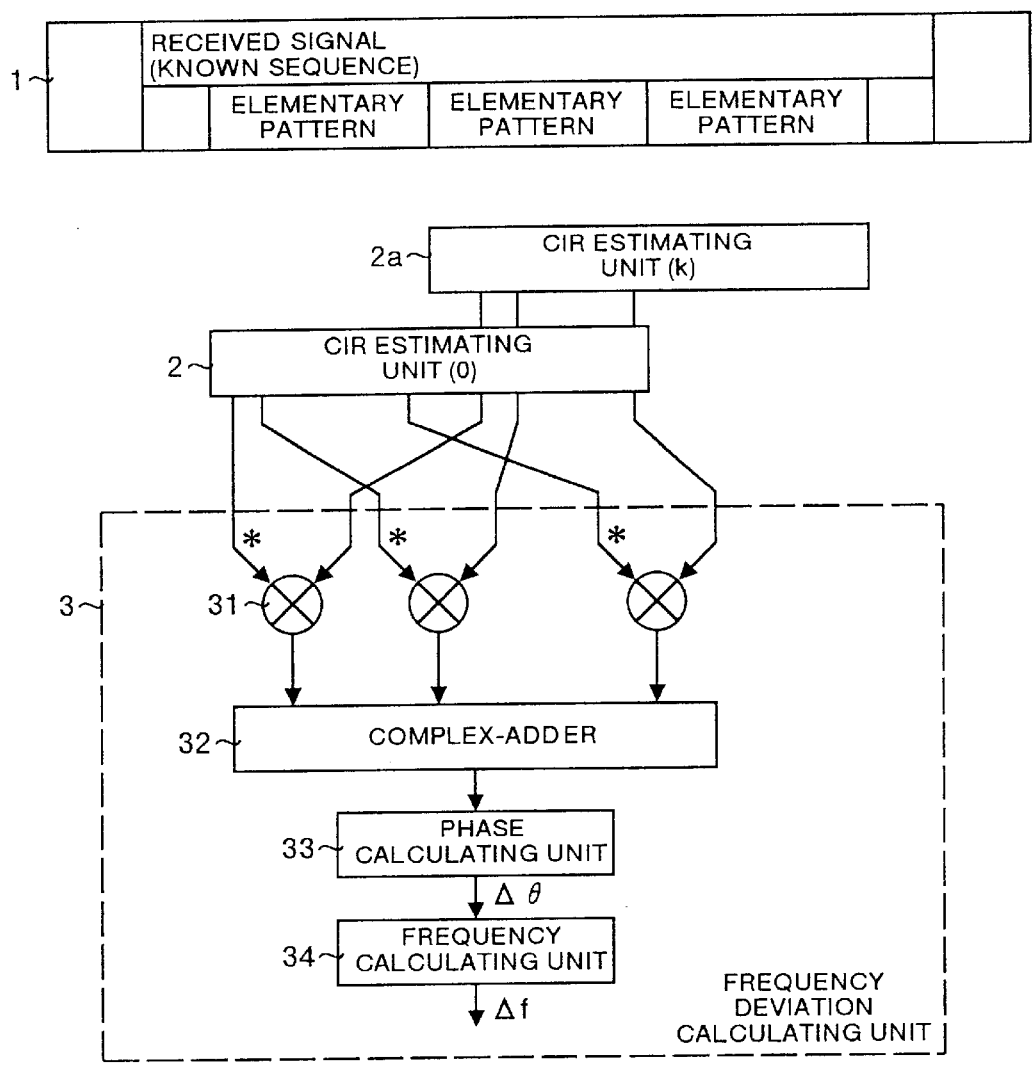
FIG. 8 illustrates a specific example of setting a timing-to-timing interval $\Delta t$ that is different from that of FIG. 6 and FIG. 7.
Figure 9:
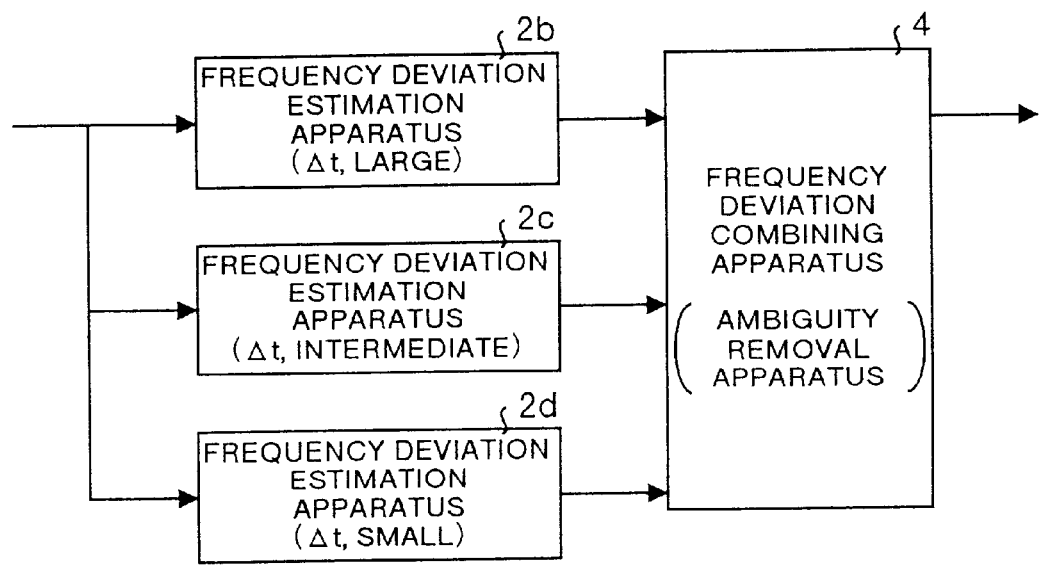
FIG. 9 illustrates the construction of a frequency deviation detection apparatus according to a third embodiment of the present invention, wherein a plurality of frequency deviation estimation apparatuses are used.
Figure 10:
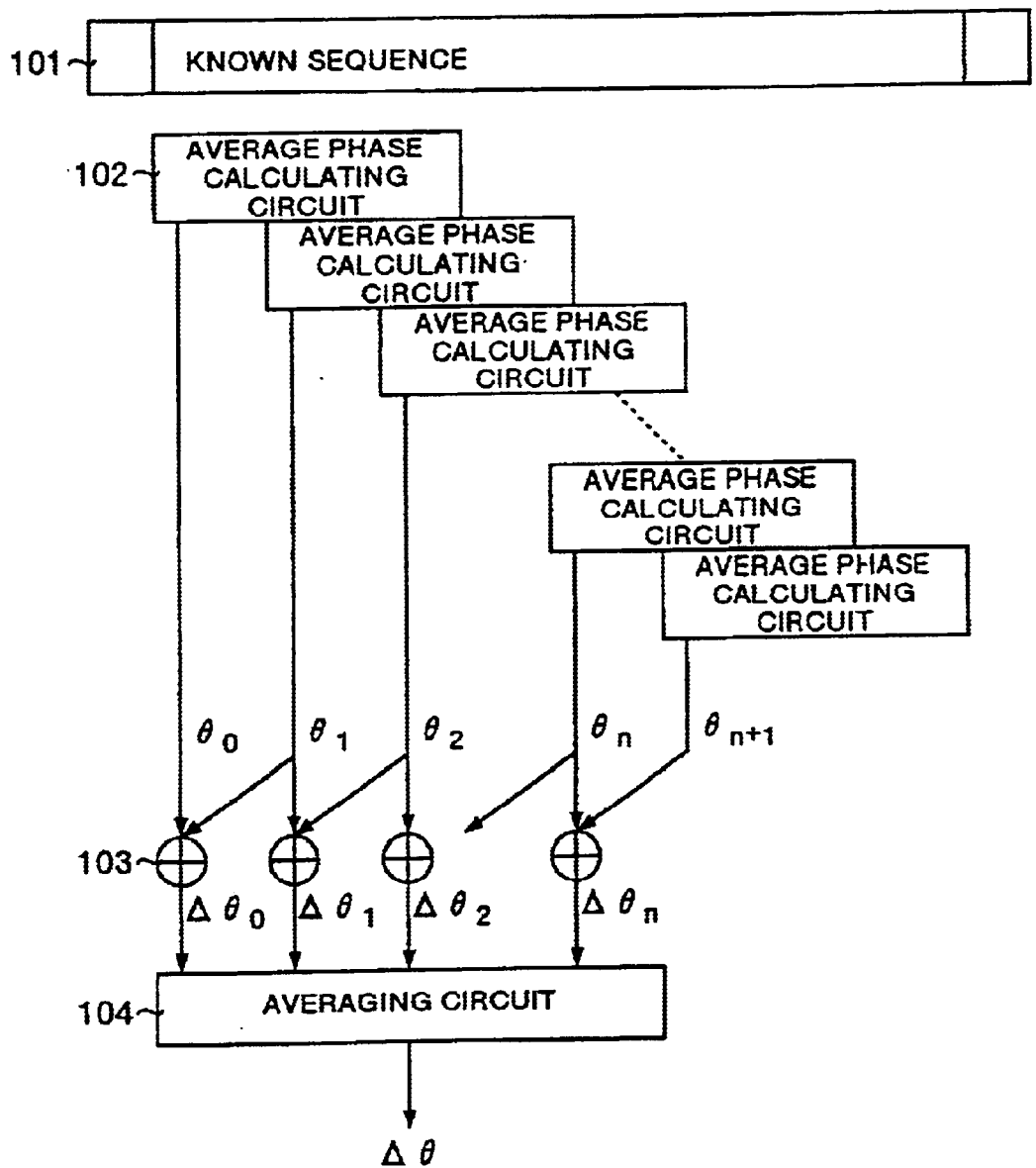
FIG. 10 illustrates the construction of a conventional frequency deviation estimation apparatus.

FIG. 8 shows a specific example of setting the timing-to-timing interval Δt that is different from that in FIG. 6 and FIG. 7. Here, a plurality of elementary patterns are used as the pattern of the received signal used in each of the two CIR estimating units. In this construction, especially in a case where the fluctuation of the channel that includes the frequency deviation is small in magnitude, a great effect of suppressing the noises is obtained. In this embodiment a construction is adopted wherein the CIR estimating unit (0) 2 is used as the CIR estimating unit, however the same effect can be obtained when two CIR estimating unit (k) 2 using a given value of k are used. FIG. 9 illustrates the construction of a frequency deviation detection apparatus according to a third embodiment of the present invention, the purpose of which is to obtain a higher-detection-precision of detecting a frequency deviation and a wider-frequency-band-range of detecting a frequency deviation, by using the frequency deviation estimation apparatuses as previously explained according to the first and second embodiments.

For example, in the frequency deviation estimation apparatus according to each of the first and second embodiments, the detection precision and the detection range are in a relationship of trade-off. Therefore, it is difficult to satisfy the both characteristics from the use of a single frequency deviation estimation apparatus. Namely, either one of them is preferentially determined. For this reason, in this embodiment, the apparatus is equipped with a plurality of frequency deviation estimation apparatuses (corresponding to 2b, 2c, and 2d) having respectively different estimation precision degrees and respectively different estimation ranges. The apparatus is further equipped with a frequency deviation combining apparatus 4 (corresponding to ambiguity removal apparatus in this figure) that combines the frequency deviation output from the respective frequency deviation estimation apparatuses. The high-precision and wide-frequency-band frequency deviation detection apparatus is thereby realized. Each of the plurality of frequency deviation estimation apparatuses used here is the frequency deviation estimation apparatuses according to the first or second embodiments.

Incidentally, as the method of combining a plurality of estimated frequency deviation of which the estimated precision degrees and estimated frequency-band ranges are respectively different from one another, there can be applied a technique of multiple open-loop AFC for MPSK that is shown in the treatise "A Multiple Open-Loop AFC for MPSK" by KUBO et. al. in Technical Report of IEICE, vol. SAT 95–92, (1996–02). Accordingly, by selecting the timing-to-timing interval Δt appropriately and in addition using an appropriate number of frequency deviation estimation apparatuses (2b, 2c, and 2d), it is possible to construct the frequency deviation estimation apparatus of FIG. 9 that realizes a widest frequency-band range of estimating a frequency deviation and a highest-estimation-precision of estimating a frequency deviation. For example, when using an n number of frequency deviation estimation apparatuses, a single CIR estimating unit (0) 2 can be commonly used. As a result, by merely equipping the apparatus with only an (n+1) number of CIR estimating units, the above-described effect can be realized.

As has been explained above, according to the present invention, the modulation of the information can be highly precisely eliminated from the signal received via the channel in which intersymbol interference exists. Accordingly, since correct channel impulse response (that can be determined using a known method such as an RLS algorithm) can be obtained it becomes possible to greatly enhance the frequency deviation estimation characteristic.

According to the present invention, by providing the channel impulse response estimating unit having the correlation unit that determines the channel impulse response (CIR) with a lesser amount of calculation, advantageously, it is possible to achieve the simplification of the hardware and simultaneously to realize the large reduction in the power consumption. Further, by providing the frequency deviation calculating unit, the trade-off between the frequency deviation detection precision and the frequency deviation detection range becomes possible. Therefore, advantageously, it is possible to optimally estimate the frequency deviation accordingly.

According to the present invention, the modulation of the information can be highly precisely eliminated from the received signal received via the channel in which intersymbol interference exists, and more correct channel impulse response (that can be determined using a known method such as an RLS algorithm) can be obtained accordingly.

Therefore, advantageously, it is possible to greatly enhance the frequency deviation estimation characteristic.

According to the present invention, by providing the first channel impulse response estimating unit having the first correlation unit that determines the channel impulse response (CIR) with a lesser amount of calculation and the second channel impulse response estimating unit having the second correlation unit, advantageously, it is possible to achieve the simplification of the hardware and simultaneously to realize the large reduction in the power consumption. Further, a desired detection precision and detection range of frequency deviation can be set more in detail, with the result that, advantageously, it is possible to optimally estimate the frequency deviation accordingly.

According to the present invention, the complex-adder performs complex addition of the complex conjugate products that have been calculated in the phase difference vector calculating unit. This equivalently means maximum ratio combining the rotating amounts of phase that have been procured from the characteristic. Therefore, advantageously, the averaging effect for suppressing the noises is obtained. Also, in the deviation calculating unit, the frequency deviation detection precision is proportional to the product of the timing-to-timing intervals at which the CIRs are procured and, further, the frequency deviation detection range is inversely proportional to the timing-to-timing interval at which the CIR is procured. Namely, here, these timing-to-timing intervals function as the trade-off parameters between the frequency deviation detection precision and the frequency deviation detection range. As a result of this, advantageously, it becomes possible to adjust the frequency deviation detection precision and the frequency deviation detection range in correspondence with the status of use, which makes it possible to realize optimum estimation of the frequency deviation.

According to the present invention, in one frequency deviation estimating unit, since the detection precision and the detection range are in the relationship of trade-off, either one of them is preferentially selectively determined. On this account, the invention is arranged to be equipped with a plurality of frequency deviation estimating units having set therein respectively different estimation precision degrees and estimation ranges. In addition, the frequency deviation that are output from the respective frequency deviation estimating unit are combined by the frequency deviation combining unit. As a result of this, advantageously, it is possible to realize a higher-precision and wider-range-of-frequency-band frequency deviation estimation apparatus.

According to the present invention, by providing the channel impulse response estimating unit having the correlation unit that determines the channel impulse response (CIR) with a lesser amount of calculation, advantageously, it is possible to achieve the simplification of the hardware and simultaneously to realize the large reduction in the power consumption. Further, by equipping the invention with the frequency deviation calculating unit, advantageously, it becomes possible to perform the trade-off between the frequency deviation detection precision and the frequency deviation detection range and to optimally estimate the frequency deviation accordingly.

According to the present invention, the complex-adder performs complex addition of the complex conjugate products that have been calculated by the phase difference vector calculating unit. This becomes equivalent to maximum ratio combining the rotating amounts of phase that have been procured from the channel impulse response. As a result, advantageously, it is possible to obtain the averaging effect for suppressing the noises. Also, in the deviation calculating unit, the frequency deviation detection precision is proportionate to the product of the timing-to-timing intervals at which the CIRs are procured and, further, the frequency deviation detection range is inversely proportionate to the timing-to-timing interval at which the CIR is procured. Namely, here, these timing-to-timing intervals function as the trade-off parameters between the frequency deviation detection precision and the frequency deviation detection range. As a result of this, advantageously, it becomes possible to adjust the frequency deviation detection precision and the frequency deviation detection range in correspondence with the status of use, which makes it possible to realize optimum estimation of the frequency deviation.

According to this invention, the modulation of the information can be highly precisely eliminated from the received signal received via the channel in which intersymbol interference exists, and correct channel impulse response (that can be determined using a known method such as an RLS algorithm) can be obtained accordingly. Therefore, advantageously, it is possible to greatly enhance the frequency deviation estimation characteristic.

According to this invention, by providing the channel impulse response estimating step that determines the channel impulse response (CIR) with a lesser amount of calculation, advantageously, it is possible to achieve the simplification of the hardware and simultaneously to realize the large reduction in the power consumption. Further, by providing the frequency deviation calculation step, advantageously, it becomes possible to perform the trade-off between the frequency deviation detection precision and the frequency deviation detection range and to optimally estimate the frequency deviation accordingly.

According to this invention, the modulation of the information can be highly precisely eliminated from the received signal received via the channel in which intersymbol interference exists, and more correct channel impulse response (that can be determined using a known method such as an RLS algorithm) can be obtained accordingly. Therefore, advantageously, it is possible to greatly enhance the frequency deviation estimation characteristic.

According to this invention, by providing the first channel impulse response estimating step that determines the channel impulse response (CIR) with a lesser amount of calculation and the second channel impulse response estimating step, advantageously, it is possible to achieve the simplification of the hardware and simultaneously to realize the large reduction in the power consumption. Further, a desired detection precision and detection range of frequency deviation can be set more in detail, with the result that, advantageously, it is possible to optimally estimate the frequency deviation accordingly.

According to this invention, in the complex-adding step, there is performed complex addition of the complex conjugate products that have been calculated in the phase difference vector calculating step. This becomes equivalent to maximum ratio combining the rotating amounts of phase that have been procured from the channel impulse response. As a result, advantageously, it is possible to obtain the averaging effect for suppressing the noises. Also, in the deviation calculating step, the frequency deviation detection precision is proportionate to the timing-to-timing interval at which the CIR is procured and, further, the frequency deviation detection range is inversely proportionate to the timing-to-timing interval at which the CIR is procured. Namely, here, these timing-to-timing intervals function as the trade-off parameters between the frequency deviation detection precision and the frequency deviation detection range. As a result of this, advantageously, it becomes possible to adjust the frequency deviation detection precision and the frequency deviation detection range in correspondence with the status of use, which makes it possible to realize optimum estimation of the frequency deviation.

According to the present invention, in one frequency deviation estimating step, since the detection precision and the detection range are in the relationship of trade-off, either one of them is preferentially selectively determined. On this account, the invention is arranged to be equipped with a plurality of frequency deviation estimating steps able to have set therein respectively different estimation precision degrees and estimation ranges. In addition, the frequency deviation estimating steps are combined in the frequency deviation combining step. As a result of this, advantageously, it is possible to realize a higher-precision and wider-range-of-frequency-band frequency deviations estimating method.

According to this invention, by providing the channel impulse response estimating step that determines the channel impulse response (CIR) with a lesser amount of calculation, advantageously, it is possible to achieve the simplification of the hardware and simultaneously realize the large reduction in the power consumption. Further, by the invention comprising the frequency deviation calculating step, advantageously, it becomes possible to perform the trade-off between the frequency deviation detection precision and the frequency deviation detection range and to optimally estimate the frequency deviation accordingly.

According to this invention, in the complex-adding step, there is performed complex addition of the complex conjugate products that have been calculated in the phase difference vector-calculating step. This becomes equivalent to maximum ratio combining the rotating amounts of phase that have been procured from the channel impulse response. As a result, advantageously, it is possible to obtain the averaging effect for suppressing the noises. Also, in the deviation calculating step, the frequency deviation detection precision is proportionate to the products of the timing-to-timing intervals at which the CIRs are procured and, further, the frequency deviation detection range is inversely proportionate to the timing-to-timing interval at which the CIR is procured. Namely, these timing-to-timing intervals function as the trade-off parameters between the frequency deviation detection precision and the frequency deviation detection range. As a result of this, advantageously, it becomes possible to adjust the frequency deviation detection precision and the frequency deviation detection range in correspondence with the status of use, which makes it possible to realize optimum estimation of the frequency deviation.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A frequency deviation estimation apparatus receiving a signal containing therein a known sequence having an elementary pattern repeated therein, said apparatus comprising:
   a channel impulse response estimating unit for estimating channel impulse responses at a plurality of timings according to the elementary pattern in the known sequence contained in the received signal; and
   a frequency deviation calculating unit for calculating frequency deviation according to the estimated channel impulse responses,
   wherein said channel impulse response estimating unit has a correlation unit for calculating a cross correlation at a plurality of timings between the elementary pattern in the known sequence recognized on a receiving side and the received signal.

2. The frequency deviation estimation apparatus according to claim 1, wherein said channel impulse response estimating unit estimates the channel impulse responses according to correlation values at the respective timings obtained from said correlation unit.

3. The frequency deviation estimation apparatus according to claim 1, wherein said frequency deviation calculating unit has,
   a phase difference vector calculating unit for calculating a phase difference vector in a complex plane defined by a real axis and an imaginary axis according to each of the channel impulse responses;
   a complex adder for performing complex addition of the phase difference vectors;
   a phase rotation extracting unit for extracting an amount of rotation in the phase according to the phase difference vector obtained by the complex addition; and
   a deviation calculating unit for calculating frequency deviation from the amount of rotation in phase.

4. A frequency deviation estimation apparatus receiving a signal containing therein a known sequence having an elementary pattern repeated therein, said apparatus comprising:
   a first channel impulse response estimating unit for estimating a first channel impulse response according to the elementary pattern in the known sequence contained in the received signal;
   a second channel impulse response estimating unit for estimating a second channel impulse response according to a sequence prepared by performing cyclic-shifting of the known sequence; and
   a frequency deviation calculating unit for calculating frequency deviation according to the first and second channel impulse responses.

5. The frequency deviation estimation apparatus according to claim 4, wherein said first channel impulse response estimating unit has a first correlation unit for calculating a cross correlation at a plurality of timings between the elementary pattern in the known sequence recognized on a receiving side and the received signal;
   said second channel impulse response estimating unit has a second correlation unit for calculating the cross correlation between the cyclic-shifted sequence and the received signal, and
   said first channel impulse response estimating unit estimates the first channel impulse responses according to correlation values obtained from said first correlation unit; and
   said second channel impulse response estimating unit estimates the second channel impulse responses according to correlation values obtained from said second correlation unit.

6. The frequency deviation estimation apparatus according to claim 4, wherein said frequency deviation calculating unit has,
   a phase difference vector calculating unit for calculating a phase difference vector in a complex plane defined by a real axis and an imaginary axis according to each of the channel impulse responses;
   a complex adder for performing complex addition of the phase difference vectors;

a phase rotation extracting unit for extracting an amount of rotation in the phase according to the phase difference vector obtained by the complex addition; and a deviation calculating unit for calculating frequency deviation from the amount of rotation in phase.

7. A frequency deviation estimation apparatus receiving a signal containing therein a known sequence having an elementary pattern repeated therein, said apparatus comprising:

a first frequency deviation estimating unit for estimating a channel impulse response according to the known sequence contained in the received signal and calculating frequency deviation from this channel impulse response;

at least one second frequency deviation estimating unit in which the intervals at which the frequency deviation are calculated are different from those in said first frequency deviation estimating unit and in which one interval at which the frequency deviation is calculated is different from another interval at which the frequency deviation is calculated; and a frequency deviation combining unit for combing the frequency deviation that are output from each of said frequency deviation estimating units.

8. The frequency deviation estimation apparatus according to claim 7, wherein said channel impulse response estimating unit has a correlation unit for calculating a cross correlation at a plurality of timings between the elementary pattern in the known sequence recognized on a receiving side and the received signal, and said first and second frequency deviation estimating units estimate the channel impulse responses according to correlation values at the respective timings obtained from said correlation unit.

9. The frequency deviation estimation apparatus according to claim 7, wherein each of said first and second frequency deviation estimating unit has, a phase difference vector calculating unit for calculating a phase difference vector in a complex plane defined by a real axis and an imaginary axis according to the channel impulse responses;

a complex adder for performing complex addition of the phase difference vectors;

a phase rotation extracting unit for extracting an amount of rotation in the phase according to the phase difference vector obtained by the complex addition; and a deviation calculating unit for calculating frequency deviation from the amount of rotation in phase.

* * * * *